(12) United States Patent
Bevilaqua et al.

(10) Patent No.: US 6,641,082 B2
(45) Date of Patent: Nov. 4, 2003

(54) AIRCRAFT FERRYING SYSTEM AND METHOD THEREOF

(75) Inventors: Paul Bevilaqua, Newhall, CA (US); Patrick Tait, Sagus, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/112,144

(22) Filed: Apr. 1, 2002

(65) Prior Publication Data

US 2003/0183719 A1 Oct. 2, 2003

(51) Int. Cl.$^7$ .................................................. B64D 5/00
(52) U.S. Cl. ........................................... 244/2; 244/189
(58) Field of Search ................................ 244/2, 3, 189, 244/190

(56) References Cited

U.S. PATENT DOCUMENTS

| | | | | |
|---|---|---|---|---|
| 2,496,087 A | * | 1/1950 | Fleming | |
| 2,863,618 A | * | 12/1958 | Doyle et al. | |
| 3,161,373 A | * | 12/1964 | Vogt | |
| 4,591,112 A | * | 5/1986 | Piasecki et al. | |
| 4,674,710 A | * | 6/1987 | Rodriguez | |
| 5,308,022 A | * | 5/1994 | Cronkhite et al. | |
| 5,521,817 A | * | 5/1996 | Burdoin et al. | |

FOREIGN PATENT DOCUMENTS

| | | | | |
|---|---|---|---|---|
| CA | 698307 | * | 11/1964 | ..................... 244/2 |
| WO | WO95/03213 | * | 2/1995 | ..................... 244/2 |

* cited by examiner

Primary Examiner—Tien Dinh (57) ABSTRACT

The invention is a system for ferrying at least one aircraft by a ferrying aircraft, the at least one aircraft and ferrying aircraft having vehicle management systems. In detail, the invention includes an attachment device for joining a wing tip of the at least one aircraft to one of the wing tips of the ferrying aircraft. A system is included for controlling the at least one aircraft and the ferrying aircraft such that the at least one aircraft flight characteristics are controlled by the ferrying aircraft. The method of ferrying a at least one aircraft by a ferrying aircraft from a first point to a second point includes the steps of: flying the at least one aircraft and ferrying aircraft; while in flight at the first point, joining a wing tip of the at least one aircraft to one of the wing tips of ferrying aircraft; and controlling the flight characteristics of the joined at least one aircraft such that the at least one aircraft and ferrying aircraft become a single aircraft controlled by the ferrying aircraft as the jointed aircraft fly toward the second point.

20 Claims, 6 Drawing Sheets

AIRCRAFT FERRYING SYSTEM AND METHOD THEREOF

BACKGROUND OF THE INVENTION

1. Field of the Invention

The invention relates to the field of aircraft ferrying aircraft and, in particular, to a system wherein a transport aircraft ferries aircraft by attaching the aircraft to be ferried to its wing tip.

2. Description of Related Art

The concept of ferrying aircraft aboard other aircraft is very old in the art. In the 1920s, dirigibles were designed to ferry aircraft attached to the gondola. The advantage of ferrying and aircraft is that it could serve as a scout for the dirigible or provide protection. In the 1940's small aircraft were suspended under larger bombers. Here the ferried aircraft was typically a fighter, which could be used for protection against hostile aircraft. The problem with such ferrying systems is that the weight of the ferried aircraft limited the payload carrying capacity and/or the range of the ferrying aircraft.

It has long been known that the aerodynamic efficiency of an aircraft can be increased by the incorporation of wing tip devices that prevent or reduce the wing tip vortexes. Thus wing tip fuel tanks installed on the P-80 improved the aerodynamic efficiency to such a degree that tip tanks were "flown for free", in that the increase in aerodynamic efficiency offset the drag and weight penalty. In the early 1950s an attempt was made to ferry small fighter aircraft on the wing tips of a larger aircraft. F-84 fighter aircraft were successfully flown attached to the wing tips of a B-36 bomber. The F-84 aircraft were again almost flown for "free". However, there were problems attaching the two aircraft together and in-flight stability was difficult to maintain. The pilots of the F-84 aircraft flew "hands off" once attached to the B-36. Thus only the B-36 flight control effectors such as ailerons, elevators, rudders, etc., were used. After several crashes, the flight test program was terminated in part because of these problems. Additionally, air-to-air refueling became practical.

However, in flight refueling requires the use of dedicated refueling aircraft. With the advent of unmanned aircraft, there is a new need to ferry such aircraft. Most recently, NASA has flown aircraft in close proximity to take advantage of the reduction in drag that such formation flying offers. Both aircraft remain separated, however and their propulsion systems remain the main source of power for flight.

Thus, it is desirable to provide an efficient system to ferry aircraft.

It is further desirable to provide an efficient system to ferry aircraft without significantly compromising the performance of the ferrying aircraft.

It is still further desirable to provide an efficient system to ferry aircraft wherein the ferried aircraft are attached to the wing rips of the ferrying aircraft and stability and aerodynamic loads of all the aircraft is controlled by the ferrying aircraft.

SUMMARY OF THE INVENTION

A system for and method of ferrying a least one aircraft by a ferrying aircraft is provided. In one embodiment, the system includes an attachment device for joining a wing tip of the at least one aircraft to one of the wing tips of the ferrying aircraft and a system for controlling the at least one aircraft and the ferrying aircraft, such that the at least one aircraft flight characteristics are controlled by the ferrying aircraft. Preferably, the ferrying aircraft will have an aircraft joined to each wing tip, which will provide improved efficiency. Movement of the aircraft's effectors controls the flight characteristics of the ferried and ferrying aircraft.

The system for controlling the flight characteristics includes the ferrying aircraft having a first effector commend system, a first vehicle management system is coupled to the first effector system; a signal transmission system is included to transmit signals from the first vehicle management system to the ferried aircraft. The ferried aircraft include: a second vehicle management system; a system to receive transmitted signals from the ferrying aircraft's vehicle management system; a second effector command system coupled to the ferried aircraft vehicle management system; and a switch mechanism for disconnecting the ferried vehicle management system from its effector command system and coupling the effector command system to the system to receive transmitted signals from the ferrying aircraft.

The first vehicle management system includes: a first control system program for controlling the first effector command system of a ferried aircraft attached to only the right wing of the ferrying aircraft; a second control system program for controlling the first effector command system of a ferried aircraft attached to only the left wing of the ferrying aircraft; a third control system program for simultaneously controlling the first and second effector command systems of ferried aircraft attached to both wings of the ferrying aircraft; and fourth control system program for controlling the ferrying aircraft when no aircraft are attached. In addition sensors mounted in the attachment means on the wing tips sense whether an aircraft is attached and provide a signal to the first vehicle management system. Such that the proper control system program can be selected.

The method includes the steps of: flying the at least one aircraft to be ferried to the ferrying aircraft; joining a wing tip of the at least one aircraft to be ferried to the wing tip of the ferrying aircraft; and controlling the flight characteristics of the joined aircraft such that the ferried aircraft are controlled by the ferrying aircraft.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Profile drag (Dp) of an aircraft is proportional to the ratio of the total wetted area to the wing area ($S_w/S$), and the induced drag depends upon aspect ratio ($b^2/S$). The optimum lift or drag ratio (L/D) depends upon the wetted aspect ratio ($b^2/S_w$). This correlation is shown in the graph in FIG. 3. If two equally sized aircraft are joined together at the wingtips, both the span and wetted area are doubled so that the wetted aspect ratio is also doubled. From the graph it can be seen that this would produce a 60 percent improvement in the lift over drag ratio and range. Joining three aircraft together almost doubles the lift over drag ratio. Therfore, the over all three aircraft is most likely less than that of the ferrying aircraft alone.

Figure 1:
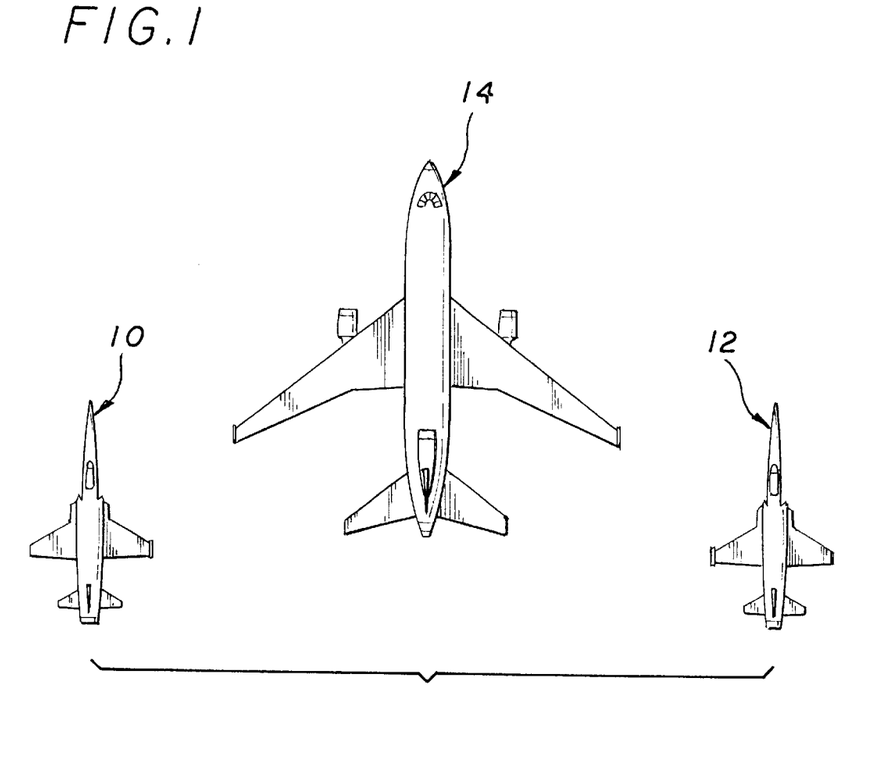
FIG. 1 is a top view of the first and second aircraft flying in formation with a third aircraft.
Figure 2:
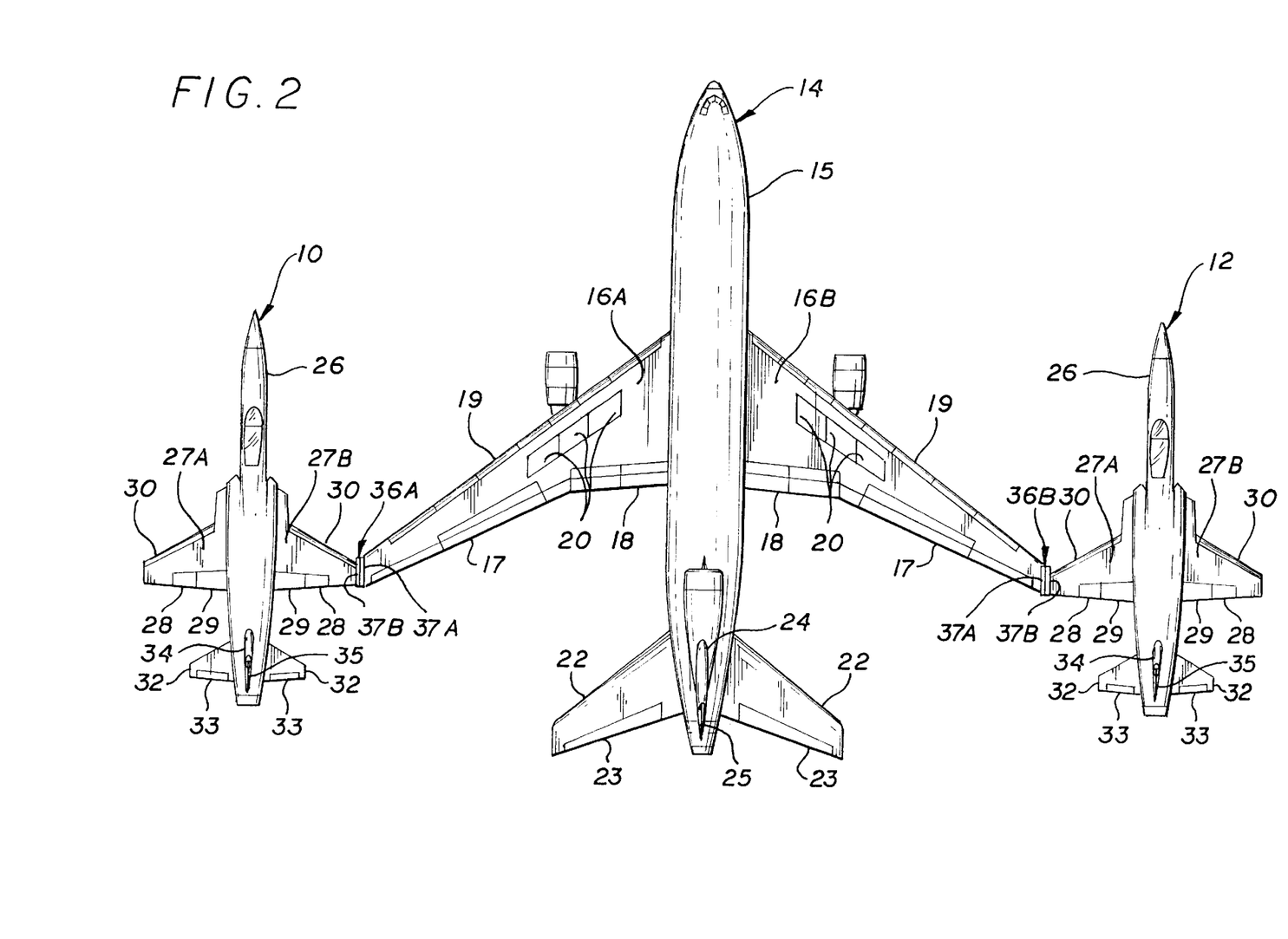
FIG. 2 is a top view of the first and second aircraft joined to the wing tips of the third aircraft, such that the third aircraft is ferrying the other aircraft.
Figure 4:
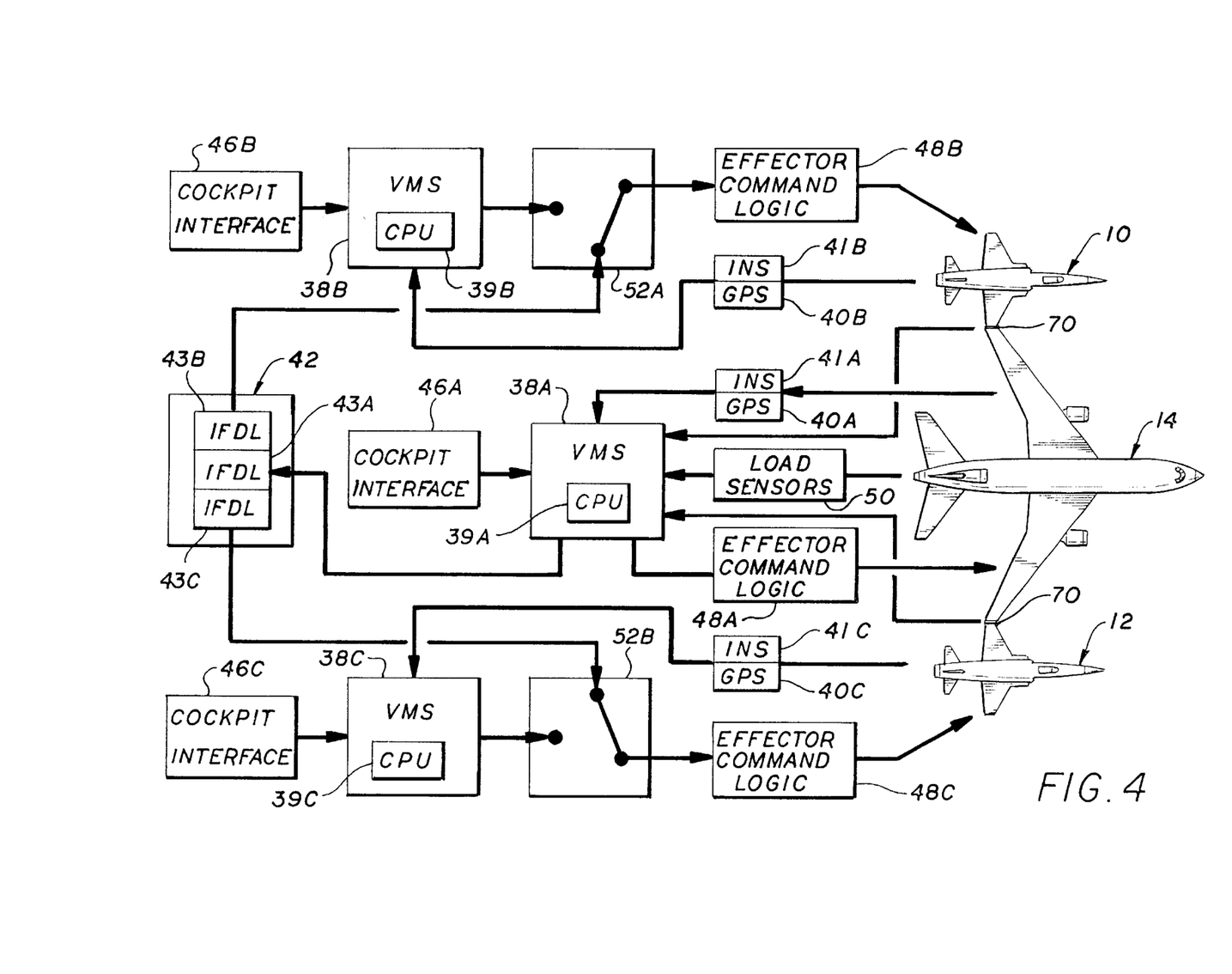
FIG. 4 is a simplified schematic of the control system for the three aircraft.

FIG. 1, discloses two small aircraft, indicated by numerals 10 and 12, flying in formation with a larger long-range transport, indicated by numeral 14. FIG. 2 illustrates the three aircraft 10, 12, and 14 joined together at their wing tips. FIG. 4 is a simplified schematic of the flight control systems for the three aircraft. The aircraft 14 includes: a fuselage 15; wings 16A and 16B with ailerons 17, flaps 18, leading edge flaps 19, and spoilers fences 20; a horizontal stabilizer 22 with elevators 23; vertical stabilizer 24 with a rudder 25. The aircraft 10 and 12 may include some or all of the features of the aircraft 14. For example, aircraft 10 and 12 include a fuselage 26; wings 27A and 27B with ailerons 28, flaps 29, leading flaps 30, a horizontal stabilizer 32 with elevators 33; and vertical stabilizer 34 with a rudder 35. The two aircraft 10 and 12 can be ferried by the aircraft 14 if mechanically connected at the tips of their wing 27B and 27A, respectively, to the tips of wings 16A and 16B of the transport 14. The method of attachment can vary, for example the clamp systems 36A and 368 having a first half 37A attached to the aircraft 14 and a second half 37B attached to the aircraft 10 and 12 used in the Air Force Program on the B-36 and F-84 is acceptable. An alternate design will be subsequently discussed.

All three aircraft incorporate vehicle management systems (VMS), indicated by numeral 38A, 38B, and 38C, which include central processing units (CPU) 39A, 39B and 39C. The aircraft 10, 12 and 14 all incorporate a Global Positioning System (GPS) system 40A, 40B, 40C, In-flight Navigational System (INS) 41A, 41B, 41C, all coupled to CPUs 39A, 39B and 39C. A communications link 42 is used to communicate between the aircraft 10, 12, and 14. This link 42 could be an electrical connection across the clamp system 36. However, for purposes of illustration, the communication link 42 are the In Flight Data Link (IFDL) 43A, 43B, 43C, which include antennas (not shown).

Each aircraft further includes a cockpit interface 46A, 46B and 46C that accepts pilot inputs and transfers them to the VMS. These inputs include the control stick or yoke, rudder petals, throttle, displays, etc. VMS inputs are provided to via effector command logic circuits 48A, 48B and 48C, which send commands to the aircraft's effectors (rudder, flaps, etc). Aircraft 14 includes a load sensor package so distributed within the wings 16A and 168 that measures loads on the aircraft and provides; an input to the CPU 39A. These sensors include both accelerometers and strain gages. A switch 52A located between the VMS 39B and Effector Command Logic circuit 48B is used to disconnect the VMS 39B and couple the Effector Logic Circuit 48B to the IFDL 43B when the aircraft 10 is connected to aircraft 14. A switch 52B is located between the VMS 39C and Effector Command Logic circuit 48C is used to disconnect the VMS 39C and couple the Effector Logic Circuit 48C to the IFDL 43C when the aircraft 12 is connected to aircraft 14. The VMS 39A, incorporates three control system programs: a first program controlling the aircraft 14 when flying alone; a second program when one aircraft is attached to the right wing of aircraft 14; and a third program when an aircraft is attached to each wing of aircraft 14.

When the three aircraft 10, 12, and 14 are connected, the load sensors 50 can determine if loads on the aircraft 14 during flight are becoming excessive. If they are, the CPU 39A sends signals to the effector command logic circuit 48A, which will actuate the appropriate effectors on the aircraft 14 to dampen them out. The CPU 39A can also send signals to aircraft 10 or 12 or both via the IFDL 43A causing Effector Logic Circuits 48B and 48C to actuate the appropriate effector (rudder, aileron or elevator, etc) to also damp out the aerodynamic loads being introduced into the airframe of aircraft 14. Whether effectors on the aircraft 14 are used first, or simultaneously with the effectors on aircraft 10 and/or aircraft 12, will depend upon the individual aircraft involved.

Thus all three aircraft are fly-by-wire, with automatic stability and control built into the VMS of each aircraft. All three aircraft effectively act as a single aircraft. However, it is necessary that the aircraft 10 and 12 have power to run the appropriate electrical and hydraulic systems. If the aircraft has an auxiliary unit it could be activated; or the engine(s) of the aircraft 10 and 12 could be running at idle.

As previously stated the clamp systems 36A and 36B that were used in on the B-36/F-84 aircraft could be used; however FIGS. 5–9 present another design for a clamp system 36A and 36B, (only clamp system 36A is illustrated). A pylon 51 is mounted on the wing tip of the wing 16A. The pylon 51 includes an aerodynamic front-end portion 52 and is mounted to the shaft 54 of an actuator 56. It is therefor extendable from a retracted position to an extended position from the wing tip, indicated by numeral 52'. The front-end portion 52 includes a conical shaped opening 60 having a female half 62A of a latch assembly 65 mounted at the apex thereof. The aft portion 64 of the pylon 51 includes a tapered slot 66. A first half 68A of a second latch assembly 69 is mounted within the slot 66. A sensor 70 for indicating when an aircraft is joined to the pylon is also mounted within the slot 66. The aircraft 10 includes an actuator 72 having an extendable shaft 74 having the male half 62B of the latch assembly 65 mounted at the end thereof. The shaft in the retracted position is indicated by numeral 74'.

Figure 5:
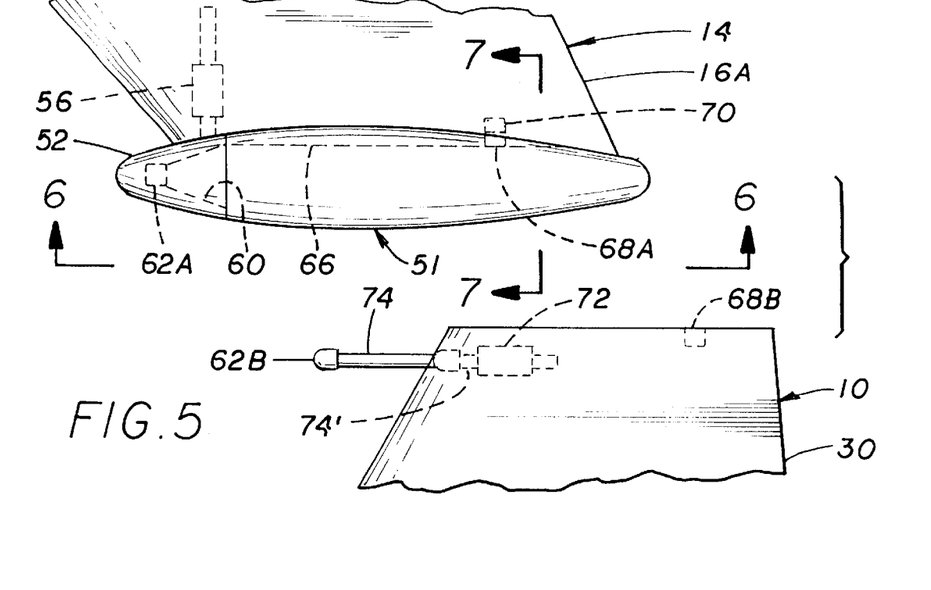
FIG. 5 is an enlarged top view of a portion of the aircraft shown in FIG. 1 illustrating the clamping assembly used to join the ferried aircraft to the ferrying aircraft.
Figure 6:
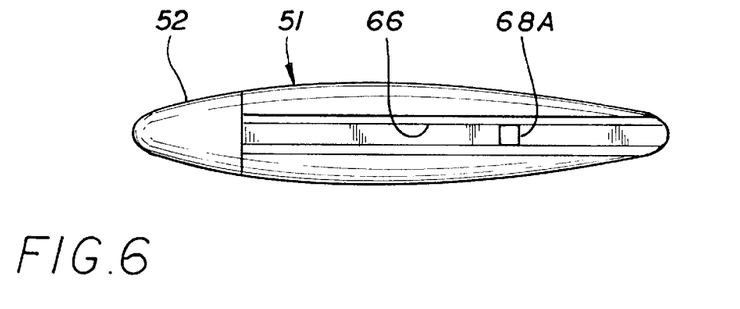
FIG. 6 is a view of FIG. 5 taken along the arrow 6.
Figure 7:
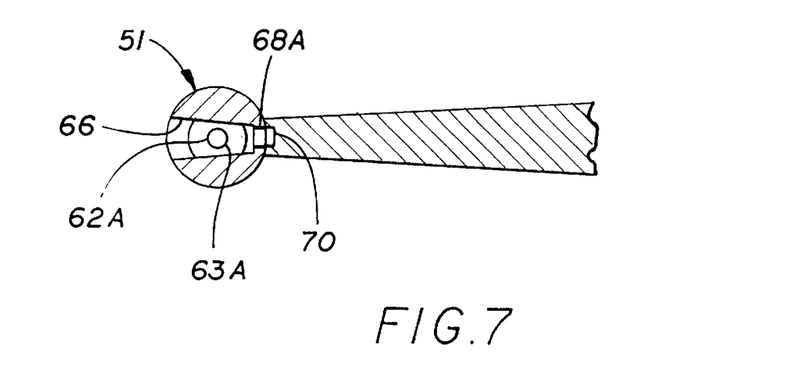
FIG. 7 is a view of FIG. 5 taken along the arrow 7.
Figure 8:
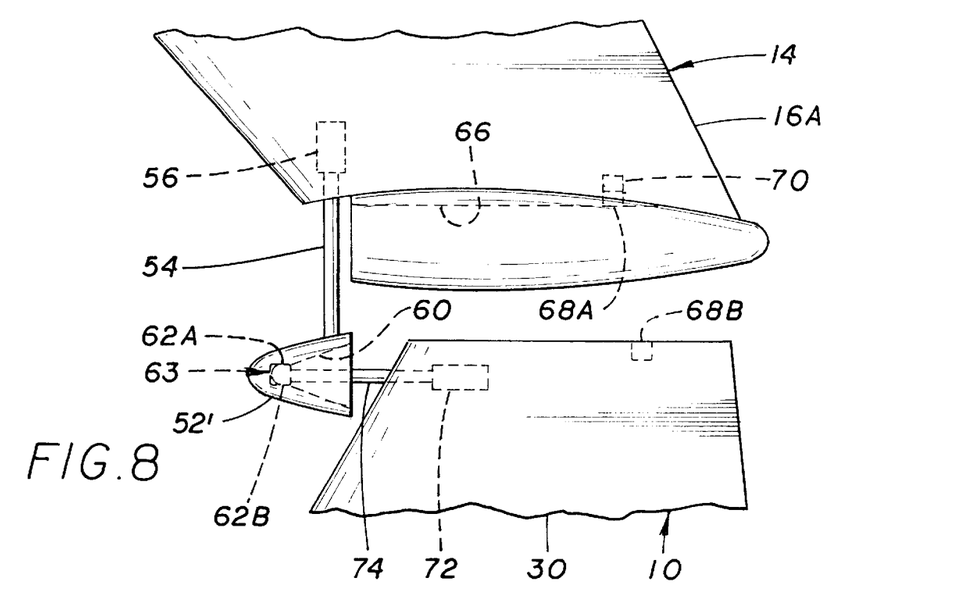
FIG. 8 is a view similar to FIG. 5 with the clamping assembly in the process of joining the two aircraft wing tip to wing tip.
Figure 9:
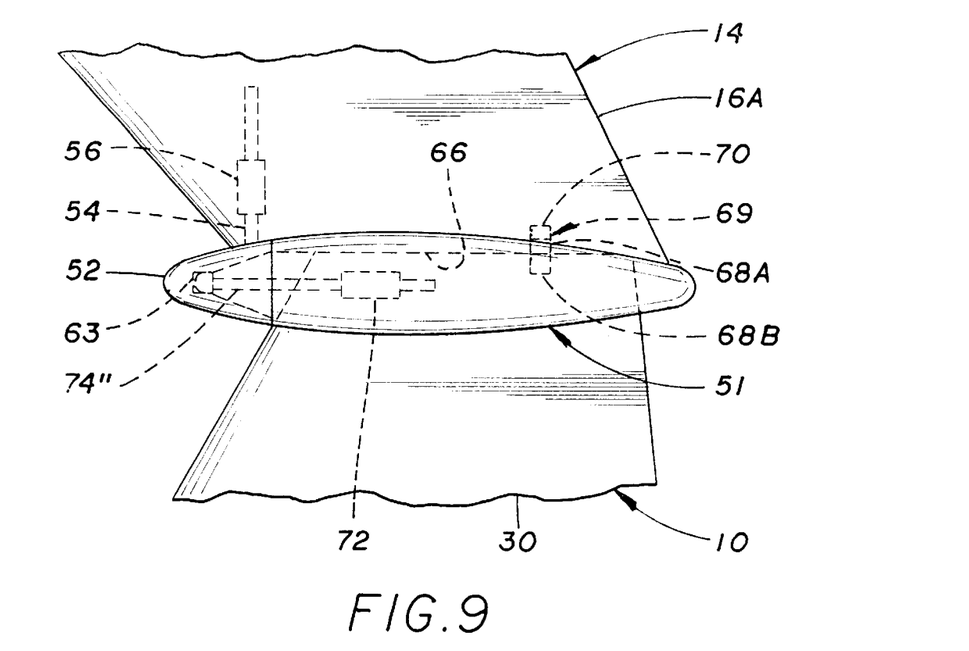
FIG. 9 is a view similar to FIG. 9 wherein the two aircraft are clamped together in the two manner illustrated in FIG. 2.

In operation, the two aircraft are flown wing tip to wing tip as shown in FIG. 5, the shaft 74 is extended to the position indicated by 74' and the front end portion 52 of the pylon 51 is extended to the position indicated by numeral 52'. The aircraft 10 is flown toward the aircraft 14 such that shaft 76' enters the conical shaped cup 60 until the male half 62B of the latch assembly 65 mates with the female half 62B. The shaft 74' is retracted to the position indicated by numeral 74" drawing the aircraft wing forward and aligning the first and second halves 68A and 68B of the second latch assembly 69. The front-end portion 52 of the pylon 51 is retracted drawing the wing tip of the wing 30 into the tapered slot 66 such that the first and second halves 68A and 68B of the latch 69 are joined together. The sensor 70 will then provide a signal that an aircraft had been joined to the wing 16A of the aircraft 14. (FIG. 9). It must again be stressed that there are many other mechanisms that can be used to join the two aircraft together. Release is simply accomplished by reversing the procedure.

Figure 3:
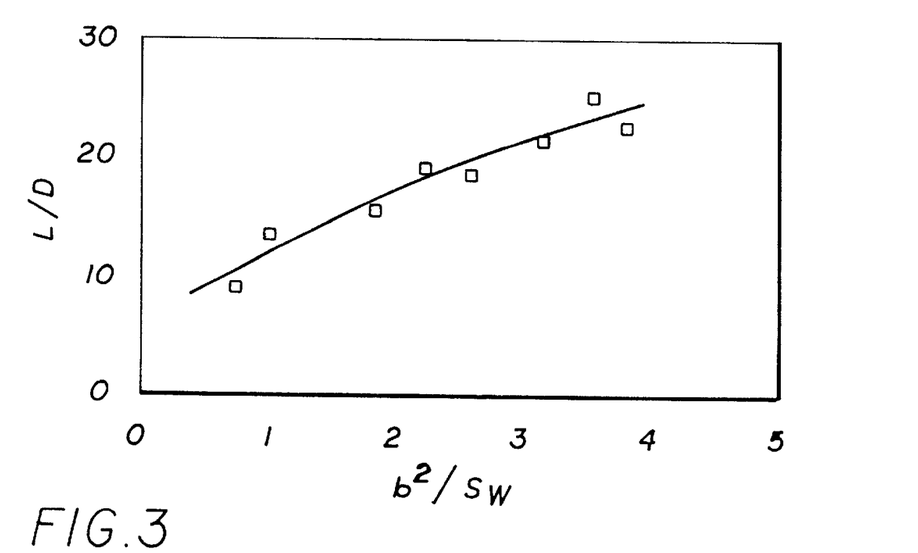
FIG. 3 is a graph of the wetted aspect ratio of an aircraft Vs the lift over drag ratio.
Figure 10:
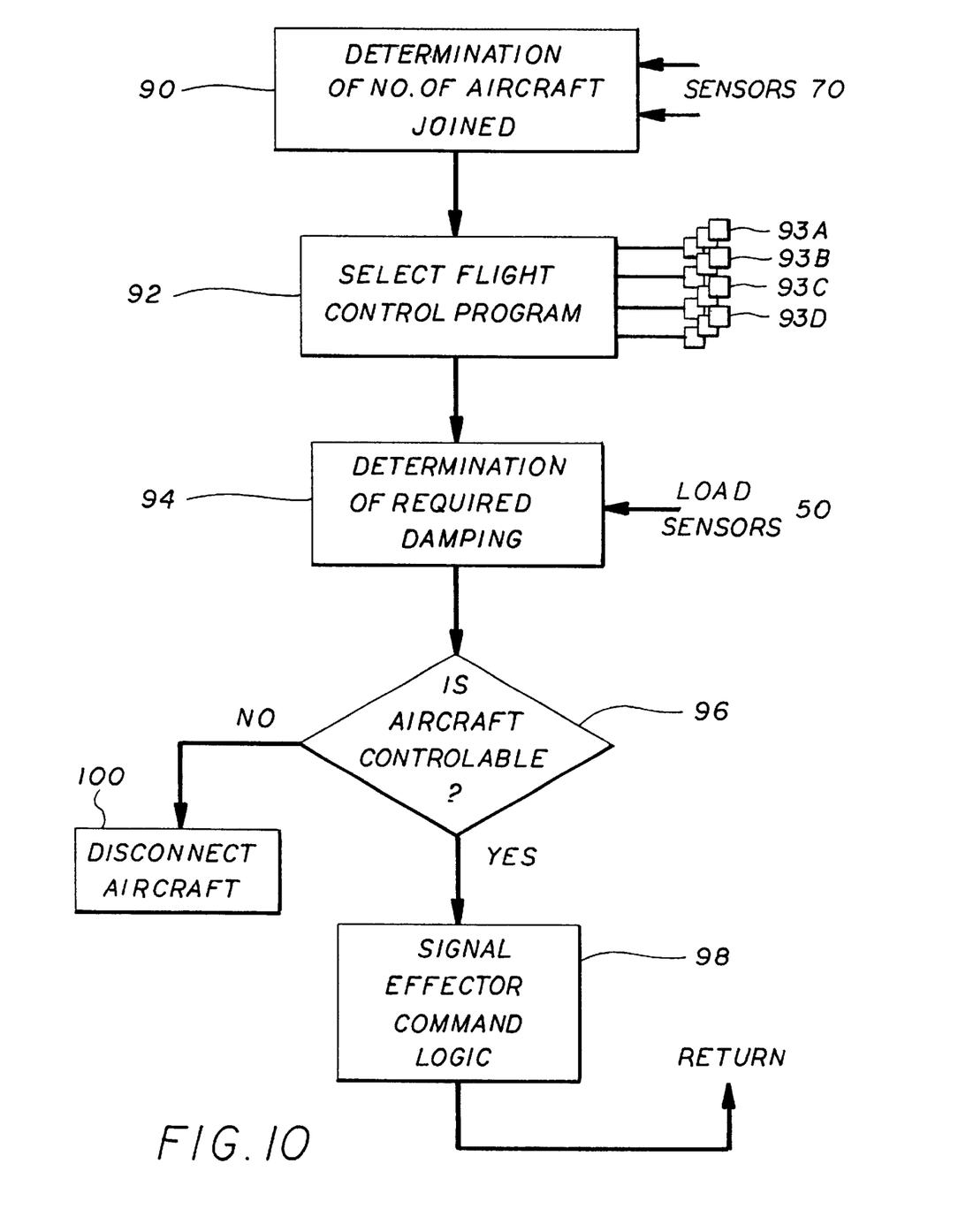
FIG. 10 is a simplified flow chart of the operation of the ferrying system.

The process of controlling the aircraft is set forth in the simple flow set forth in FIG. 10. Referring to FIGS. 1, 3 and 10, the steps include:

1. Step 90—Determination if aircraft 10 and 12 are attached to the wings of the ferrying aircraft 14. The sensors 70 mounted in the pylons 51 send signals to the VMS 38A.
2. Step 92—Select flight control computer program. This is accomplished by the CPU 39A, which selects from the three programs: Program 93A for an aircraft attached to the right wing 16A, Program 93B for an aircraft attached to wing 16B; Program 93C when an aircraft is attached to both wings; and Program 93D is used when no aircraft are attached.
3. Step 94—Determination of required damping of loads. The CPU 39A receives inputs from the load sensors 50.
4. Step 96—Determination if aircraft is still controllable. If yes, to Step 98; if not, to step 100.
5. Step 98—Actuate effectors. The CPU 39A sends signals to the Effector command logic circuits, which in turn actuate the actual effectors.
6. Step 100—Disconnect aircraft. The clamp assemblies 36A and/or 36B are signaled by the CPU 39A to release the aircraft 10 and/or 12.

The aircraft 14 is shown ferrying two aircraft 10 and 12 in all the Figures, which would be most effective. However, as discussed above, a single aircraft can be ferried; however, with reduced effectiveness. This system will allow a larger transport aircraft with a long range to ferry shortrange aircraft. In addition, aircraft such as unmanned surveillance aircraft can be ferried to the theatre of operation, launched and recovered.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. A system for ferrying at least one aircraft by a ferrying aircraft comprising:

attachment means for joining a wing tip of the at least one aircraft to one of the wing tips of the ferrying aircraft; and control means mounted in the ferrying aircraft for controlling the at least one aircraft and the ferrying aircraft such that the at least one aircraft flight characteristics are controlled by the ferrying aircraft, wherein the control means includes logic for disconnecting the at least one aircraft when the ferrying aircraft is not controllable with the at least one aircraft attached.

2. The system as set forth in claim 1 wherein said control means comprises:

a first effector command system;

a first vehicle management system;

second means to transmit signals from said first vehicle management system to the at least one aircraft;

a second vehicle management system;

third means to receive transmitted signals from said first vehicle management system a second effector command system coupled to said second vehicle management system; and fourth means for disconnecting said second vehicle management system from said second effector command system and coupling said second effector command system to said third means.

3. The system as set forth in claim 2, wherein said first vehicle management system includes:

a first control system program for controlling said first effector command system of a ferried aircraft attached to only the right wing of the ferrying aircraft;

a second control system program for controlling said second effector command system of a ferried aircraft attached to only the left wing of the ferrying aircraft;

a third control system program for simultaneously controlling said first and said second effector command systems; and fifth means to switch between said first and second control systems.

4. The system as set forth in claim 3 wherein said second and third means are in flight data links.

5. The system as set forth in claim 4, wherein said fourth means is a switch.

6. The system as set forth in claim 1, or 2, or 3, or 4, wherein the ferrying aircraft includes sensors mounted in said attachment means electrically coupled the first vehicle management system for indicating if the at least one aircraft is attached thereto.

7. A method of ferrying a least one aircraft by a ferrying aircraft from a first point to a second point, the method comprising the steps of:

flying the at least one aircraft and ferrying aircraft;

while in flight at the first point, joining a wing tip of the at least one aircraft to one of the wing tips of ferrying aircraft;

controlling the flight characteristics of the joined at least one aircraft such that the at least one aircraft and ferrying aircraft become a single aircraft controlled by the ferrying aircraft as the jointed aircraft fly toward the second point; and disconnecting the at least one aircraft when the ferrying aircraft is not controllable with the at least one aircraft attached.

8. The method as set forth in claim 7 wherein the at least one aircraft and ferrying aircraft include flight control system and the step of controlling the flight characteristics of the joined at least one aircraft such that the at least one aircraft and ferrying aircraft fly as a single aircraft controlled by the ferrying aircraft includes the step of connecting the flight control system of the at least one aircraft to the flight control system of the ferrying aircraft.

9. The method as set forth in claim 8 comprising the step of separating the ferried aircraft from the ferrying aircraft upon reaching the second point.

10. An aircraft system comprising:

a ferrying aircraft having a vehicle management system;

at least one ferried aircraft having vehicle management system;

attachment means for joining a wing tip of the said at least one aircraft to one of the wing tips of said ferrying aircraft; and control means mounted in said ferrying aircraft for controlling said at least one aircraft and said ferrying aircraft such that said at least one aircraft flight characteristics are controlled by said ferrying aircraft, wherein the control means includes logic for disconnecting the at least one aircraft when the ferrying aircraft is not controllable with the at least one aircraft attached.

11. The system as set forth in claim 10 wherein said control means comprises:

a first effector command system;

a first vehicle management system;

second means to transmit signals from said first vechicle management system to said at least one aircraft;

a second vehicle management system;

third means to receive transmitted signals from said first vehicle management system a second effector command system coupled to said second vehicle management system; and fourth means for disconnecting said second vehicle management system from said second effector command system and coupling said second effector command system to said third means.

12. The system as set forth in claim 11, wherein said first vehicle management system includes:

a first control system program for controlling the first effector command system of a said at least one ferried aircraft attached to only the right wing of said ferrying aircraft;

a second control system program for controlling said second effector command system of a said at least one ferried aircraft attached to only the left wing of said ferrying aircraft;

a third control system program for simultaneously controlling said first and second effector command systems; and fifth means to switch between said first and second control systems.

13. The system as set forth in claim 12 further comprising said second and third means are in flight data links.

14. The system as set forth in claim 13, wherein said fourth means is a switch.

15. The system as set forth in claim 10, or 11 or 12, or 13, or 14, wherein said ferrying aircraft includes sensors mounted in said attachment means electrically coupled to the first vehicle management system for indicating if said at least one aircraft is attached thereto.

16. An aircraft capable of ferrying another aircraft, comprising:

an attachment device on a wingtip operable to join the ferrying aircraft to an aircraft to be ferried, wherein the aircraft to be ferried includes a vehicle management system; and a control system mounted in the ferrying aircraft operable to adjust control surfaces on the ferried aircraft and the ferrying aircraft during flight, wherein the control system includes logic operable to disconnect the ferried aircraft when the ferrying aircraft is not controllable with the ferried aircraft attached.

17. The aircraft as set forth in claim 16 wherein the attachment device comprises:

an actuator including a shaft mounted in the wing of the ferrying aircraft; and a pylon including a first portion mounted to the shaft of the actuator, wherein the shaft is operable to extend the first pylon portion from a retracted position to an extended position.

18. The aircraft as set forth in claim 17, wherein the first pylon portion includes a cup portion that is engaged by a rod extending from the aircraft to be ferried, and the pylon further comprises a slot configured to receive a portion of the aircraft to be ferried as the actuator retracts the shaft when the rod of the aircraft to be ferried engages the cup portion.

19. The aircraft as set forth in claim 18, further comprising a sensor configured to provide a signal to the control system to indicate a connection with the aircraft to be ferried.

20. The aircraft as set forth in claim 19 wherein the pylon is mounted on the wingtip of the ferrying aircraft, and the slot receives a wingtip portion of the aircraft to be ferried.

* * * * *